No. 824,467. PATENTED JUNE 26, 1906.
H. B. BURKE.
CAR BRAKE.
APPLICATION FILED FEB. 20, 1906.
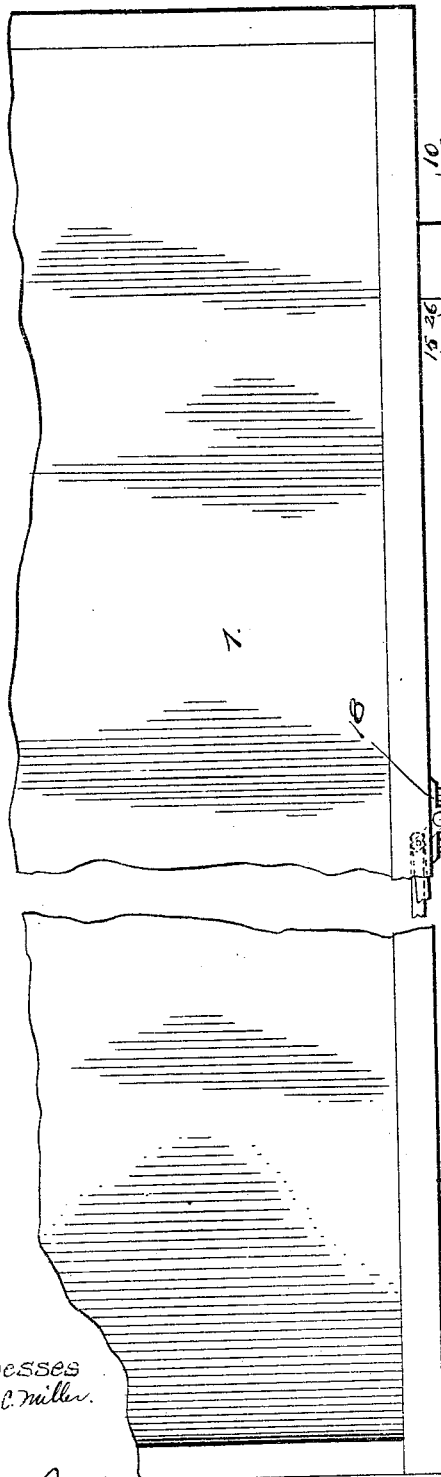
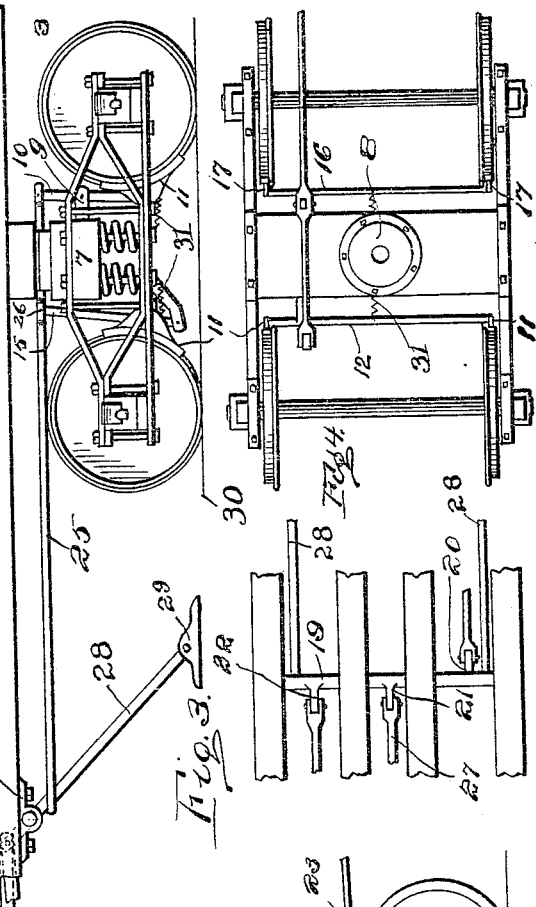
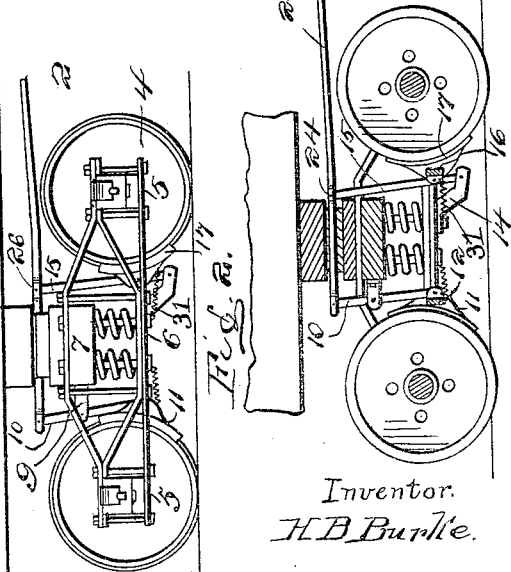
Witnesses
Jesse C. Miller
Inventor
H. B. Burke
by N. C. Evert Co.
Attorneys

UNITED STATES PATENT OFFICE.

HENRY B. BURKE, OF WINDBER, PENNSYLVANIA.

CAR-BRAKE.

No. 824,467.  Specification of Letters Patent.  Patented June 26, 1906.

Application filed February 20, 1906. Serial No. 302,056.

*To all whom it may concern:*

Be it known that I, HENRY B. BURKE, a citizen of the United States of America, residing at Windber, in the county of Somerset and State of Pennsylvania, have invented certain new and useful Improvements in Car-Brakes, of which the following is a specification, reference being had therein to the accompanying drawings.

This invention relates to certain new and useful improvements in brake-riggings for railroad-cars, such as passenger-coaches and freight-cars.

The primary object of my invention is to provide a novel brake-rigging which will insure a positive gripping of brake-shoes upon the wheels of a car when the same are operated, the rigging being constructed whereby the brake-shoes of the trucks of a car can be simultaneously applied to retard the movement of the car.

Another object of this invention is to provide a brake-rigging which can be easily and quickly applied to the ordinary type of car at present used, the brake-rigging being extremely simple in construction, whereby it can be easily operated, repaired, and manufactured at a comparatively small expense.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a fragmentary side elevation of a car equipped with my improved brake-rigging. Fig. 2 is a vertical sectional view of one of the trucks thereof. Fig. 3 is a fragmentary view of a car-body, illustrating the main actuating-shaft of my improved brake-rigging; and Fig. 4 is a plan of one of the trucks equipped with my improved brake.

In the accompanying drawings, I have illustrated the body 1 of a car as being supported by four-wheel trucks 2 and 3, said trucks being of a conventional form embodying wheels 4, journal-boxes 5 5, and arch-frames 6. The arch-frames 6 support a transversely-arranged bolster 7, carrying a center plate 8, upon which the body of the car rests.

My invention resides in providing the bolsters 7 7 of the trucks 2 and 3 with outwardly-extending brackets 9, in which are fulcrumed bars 10 10, the lower end of said bars being provided with brake-shoes 11 11, connected together by transverse braces 12 12.

One of the arch-frames of each truck is provided with a depending bracket 14, and in the end of said bracket is pivoted a bar 15, which is connected to a transverse brace 12, carrying brake-shoes 17 17 upon its ends, said brake-shoes, together with the brake-shoes 11 11, being adapted to engage the periphery of the wheels 4 of each truck.

The body of the car 1 intermediate its ends is provided with depending bearings 18, in which is journaled a rock-shaft 19, carrying outwardly-extending arms 20, 21, and 22. The arm 22 is connected by a draw-rod 23 to the bar 10 of the truck 2, said draw-rod also being connected to the upper end of the bar 15, as at 24. The arm 20 is connected by a draw-rod 25 to the upper end of the bar 10 of the truck 3, said draw-rod also being connected to the upper end of the bar 15 of the truck 3, as at 26.

The central arm 21 of the rock-shaft 19 is connected to the cylinder rod or piston 27 of an air-brake cylinder, (not shown,) whereby when the air-brakes of a train are operated to set the brake-shoes 11 11 and 17 17 the shaft 19 will be rocked, which through the medium of the draw-rods 23 and 25 will swing the shoes 11 11 and 17 17 into engagement with the peripheries of the wheels 4 of the trucks 2 and 3. The rock-shaft 19 is also provided adjacent its ends with rearwardly-extending brake-arms 28 28, carrying upon their outer sides brake-shoes 29 29, said shoes being adapted to engage the tread 30 of the rails over which a car is passing. The brake-shoes 29 29 are lowered into engagement with the rails when the brakes are being set to engage the wheels of the car.

In connection with the brake-shoes 11 of each truck I use springs 31, said springs being adapted to return the brake-shoes to their normal position and releasing the wheels of the truck when the rock-shaft 19 is returned to its normal position.

My improved brakes can be readily used upon street-cars, mine-cars, and such cars where brakes are commonly used.

By the construction and arrangement of my improved brakes and their operating parts and levers it will be obvious that the brake-shoes are arranged between the wheels upon each side of the truck and that the brake-shoes are simultaneously moved upon the trucks of a car, thereby insuring a positive retardation of the car when the brakes are set or applied.

I do not care to confine myself to the operation of my improved brakes by an airbrake system, as the rock-shaft 19 may be otherwise operated to set the brakes.

Such changes in the construction and operation of my improved brake-rigging as are permissible by the appended claims may be resorted to without departing from the spirit and scope of the invention.

What I claim, and desire to secure by Letters Patent, is—

1. In a brake-rigging, the combination with a car supported by trucks, said trucks embodying arch-frames and bolsters, of brackets carried by said frames and said bolsters, bars fulcrumed in said brackets, brake-shoes carried by the lower ends of said bars, draw-rods connected to the upper ends of said bars, a rock-shaft carried by said car, outwardly-extending arms carried by said rock-shaft and connecting with said draw-rods, brake-shoes connected to some of said arms and adapted to engage the treads of rails, substantially as described.

2. A brake-rigging embodying fulcrumed bars, brake-shoes carried by the lower ends of said bars, draw-rods connected to the upper ends of said bars, a rock-shaft connected to said draw-rods and adapted to move said brake-shoes in unison, depending arms carried by said rock-shaft, brake-shoes carried by said arms and adapted to engage the track, substantially as described.

In testimony whereof I affix my signature in the presence of two witnesses.

HENRY B. BURKE.

Witnesses:
B. A. MURRAY,
M. E. SELL.